United States Patent [19]

Fukunaga

[11] Patent Number: 4,523,496

[45] Date of Patent: Jun. 18, 1985

[54] AUTOMATIC CONTROLLING METHOD OF TRANSMISSION

[75] Inventor: Takao Fukunaga, Hirakata, Japan

[73] Assignee: Kabushiki Kaisha Daikin Seisakusho, Osaka, Japan

[21] Appl. No.: 435,246

[22] Filed: Oct. 19, 1982

[30] Foreign Application Priority Data

Oct. 30, 1981 [JP] Japan ................................ 56-174727

[51] Int. Cl.³ ...................... B60K 41/08; B60K 28/00
[52] U.S. Cl. ........................................ 74/866; 74/862;
74/863; 180/290
[58] Field of Search .................. 180/290; 74/866, 862, 74/861, 752 A, 752 D, 863

[56] References Cited

U.S. PATENT DOCUMENTS

| | | | |
|---|---|---|---|
| 1,168,179 | 1/1916 | Douglas | 180/290 X |
| 2,704,132 | 3/1955 | Marco | 180/290 |
| 3,973,804 | 8/1976 | Engfer et al. | 180/290 |
| 4,033,202 | 7/1977 | Ahlen et al. | 74/866 |
| 4,172,505 | 10/1979 | Rabus et al. | 180/290 |
| 4,206,829 | 6/1980 | Melocik | 180/290 |
| 4,262,335 | 4/1981 | Ahlen et al. | 74/752 D X |
| 4,361,060 | 11/1982 | Smyth | 74/866 |
| 4,414,863 | 11/1983 | Heino | 74/752 D X |

FOREIGN PATENT DOCUMENTS

| | | | |
|---|---|---|---|
| 2813697 | 3/1977 | Fed. Rep. of Germany | 74/866 |
| 147936 | 2/1976 | Japan . | |
| 1425931 | 2/1976 | United Kingdom | 180/290 |
| 2080451 | 2/1982 | United Kingdom | 74/866 |

Primary Examiner—Allan D. Herrmann
Assistant Examiner—Stephen B. Andrews
Attorney, Agent, or Firm—Armstrong, Nikaido, Marmelstein & Kubovcik

[57] ABSTRACT

An automatic controlling method of a transmission for shifting a higher speed-changing stage in use to a lower side in regular sequence according to an increase in a loaded weight, and to widen a high-speed operable range at each position of gear shift used; in a vehicle having a transmission system transmitting an engine power to driving wheels through the means of a clutch and a staged-gear transmission.

4 Claims, 7 Drawing Figures

AUTOMATIC CONTROLLING METHOD OF TRANSMISSION

FIELD OF THE INVENTION

This invention relates to an automatic controlling method of a transmission which is designed to control a range of shift positions used by the transmission according to loaded weight of vehicle.

Automatic controlling methods of automobile transmission utilizing controlling factors such as vehicle speed, engine rotational speed, engine loading etc. have hitherto been well known (EX.: Japanese Utility Model No. 52-147936), however, controlling methods utilizing a loaded weight as the controlling factor have not been devised. Therefore, especially in a large loaded weight, a trouble has been experienced such that vehicle speed has increased excessively in proportion to the loaded weight or that an appropriate engine braking effect is not obtainable in descending a slope, for example when a conventional controlling method is applied on a vehicle such as a truck or a fork lift.

SUMMARY OF THE INVENTION

An object of this invention is to solve the above troubles and to control the transmission in a running mode suitable to the loaded weight.

In order to accomplish the above object, this invention is so deviced as to shift a higher speed position of the transmission in use to a lower side in regular sequence according to an increase in the loaded weight, and further to widen a high-speed range at each position of gear shift; in a vehicle having a transmission system transmitting an engine power to driving wheels through the means of a clutch and a stage-gear transmission.

DETAILED DESCRIPTION OF THE INVENTION

Figure 1:
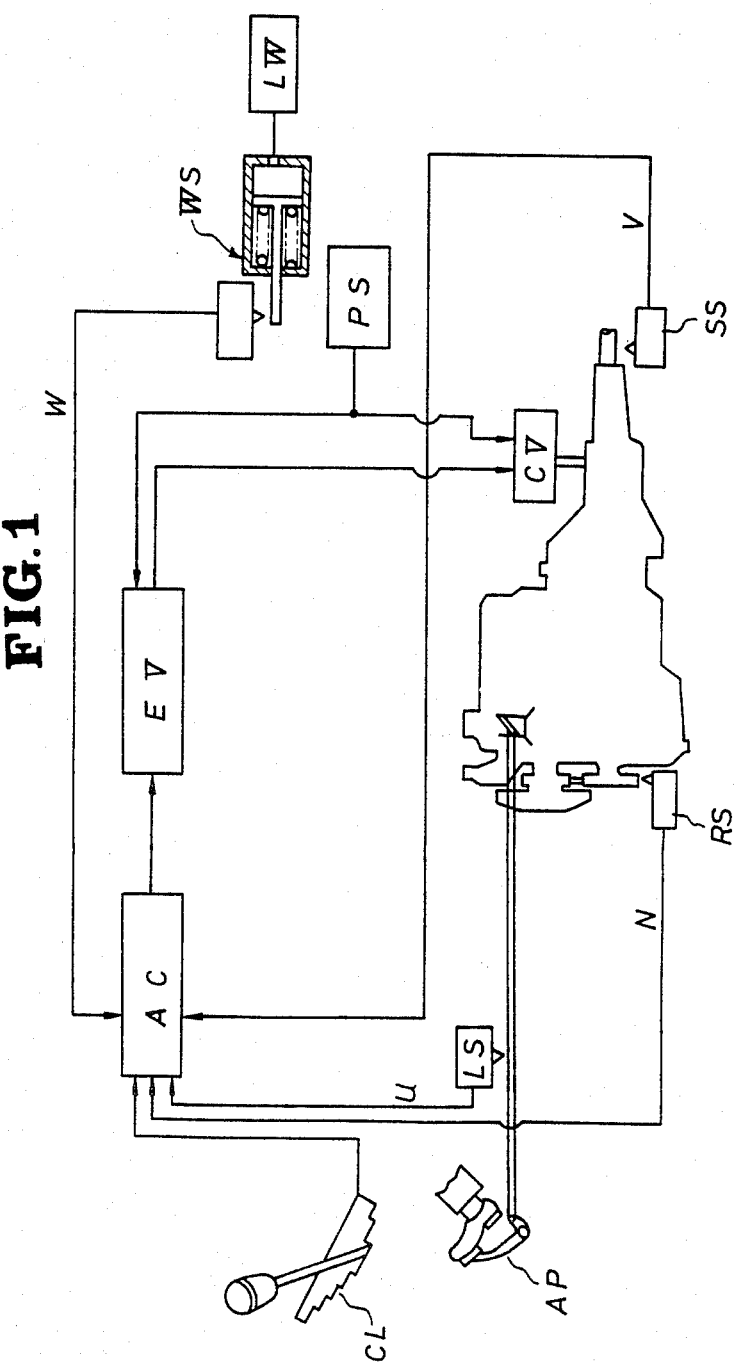
FIG. 1 is a system diagram of this invention.
Figure 2:
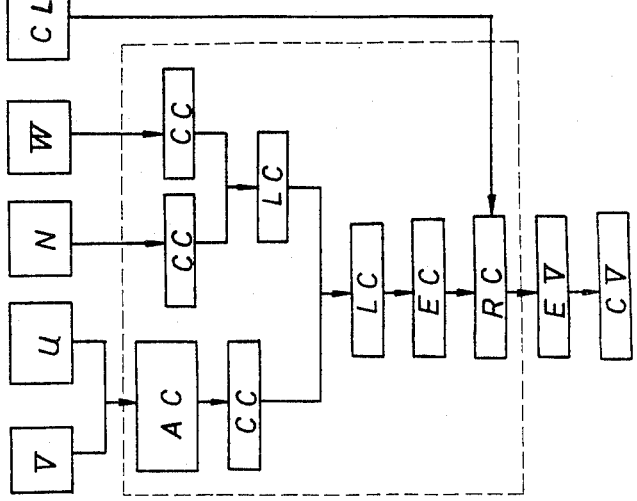
FIG. 2 is a block diagram of this invention.

An application of this invention on a conventional automatic transmission mechanism, which utilizes a vehicle speed, an engine load, and an engine rotational speed as controlling factors, will be described hereunder as an embodiment. As shown in the system diagram of FIG. 1, the engine load U, the vehicle speed V, the engine rotational speed N, and the loaded weight W are converted into electric signals according to a shifted position of the change lever CL and a stepped depth of the accelerator pedal AP, and these informations are fed to the arithmetic circuit AC; an electro-magnetic valve EV functions corresponding to a position of gear shift upon functioning of the arithmetic circuit AC; and the control valve CV opens and closes to perform gear changing operation. Incidentally, LS is an engine load sensor, RS is an engine rotational speed sensor, SS is a vehicle speed sensor, PS is an oil pressure source, WS is a loaded weight sensor, and LW is a source of the loaded weight in FIG. 1. In the block diagram as shown in FIG. 2, the arithmetic circuit AC in FIG. 1 corresponds to an area surrounded by the broken line In FIG. 2, AC is a load calculating amplification circuit, CC is a comparator circuit, LC is a logical circuit, EC is an electric current amplification circuit, and RC is a relay actuating circuit. A speed ratio $\gamma$ is a ratio of the vehicle speed to the engine rotational speed ($\gamma = V/U$).

Figure 3:
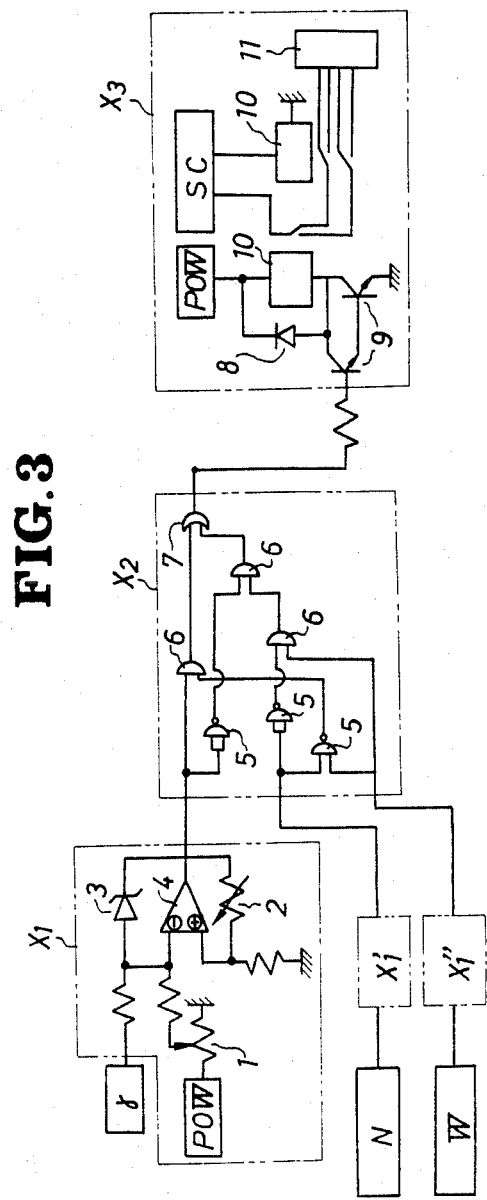
FIG. 3 is a circuit diagram of this invention.

A two-range gear shift, which is the most principal gear shift system, will be described hereunder. In FIG. 3 showing the circuit diagram for converting continuous values: the speed ratio $\gamma$, the engine rotational speed N, and the loaded weight W into a speed ratio by means of a discontinuous shift position; $X_1$, $X_1'$, and $X_1''$ are comparator circuits (schmidt-trigger circuits), $X_2$ is a logical circuit, $X_3$ is a actuating electric current amplification circuit for converting an output from the logical circuit $X_3$ into actuation of the electro-magnetic valve 11. The vehicle speed V, the engine load U, the engine rotational speed N, and the loaded weight W, which are converted into electric signals through the vehicle speed sensor SS, the engine load sensor LS, the engine rotational speed sensor RS, and the loaded weight sensor WS as shown in FIG. 1, are further converted into an electric signal ON or OFF making a designated voltage value as its border by means of schmidt-trigger circuits $X_1$, $X_1'$, and $X_1''$ respectively. Then, the converted signals are calculated in the logical circuit $X_2$ which is so compared as to follow a logic previously prepared, and a signal ON or OFF is emerged from the circuit $X_2$ as a result. The emerged signal is received by the circuit $X_3$, and the gear shift control is finally performed thereat. 1 and 2 are variable resistances, 3 is a zener diode, 4 is an operational amplifier, 5 is a NAND circuit, 6 is an AND circuit, 7 is an OR circuit, 8 is a diode, 9 is a transistor, 10 is a relay, 11 is the electro-magnetic valve as same as the valve EV (FIG. 1), POW is a power supply, and SC is a source of the change lever signal in FIG. 3. In case where the circuit $X_1$ is so adjusted to become ON when the speed ratio $\gamma$ is above a prescribed value and becomes OFF when it is below the value, the circuit $X_1'$ is so adjusted to become ON when the engine rotational speed N is above a prescribed value and becomes OFF when it is below the value, and the circuit $X_1''$ is so adjusted as to become ON when the loaded weight W is above a prescribed value and becomes OFF when it is below the value; and then these circuits are connected through the logical circuit $X_2$ to the circuit $X_3$; the electro-magnetic valve 11 reacts as shown in the following table to control the shift position.

| $\gamma$ | OFF | OFF | OFF | OFF | ON | ON | ON | ON |
|---|---|---|---|---|---|---|---|---|
| N | OFF | ON | OFF | ON | OFF | ON | OFF | ON |
| W | OFF | OFF | ON | ON | OFF | OFF | ON | ON |
| Electro-magnetic valve | OFF | OFF | ON | OFF | ON | ON | ON | OFF |
| Shift position | 1 | 1 | 2 | 1 | 2 | 2 | 2 | 1 |

Figure 4:
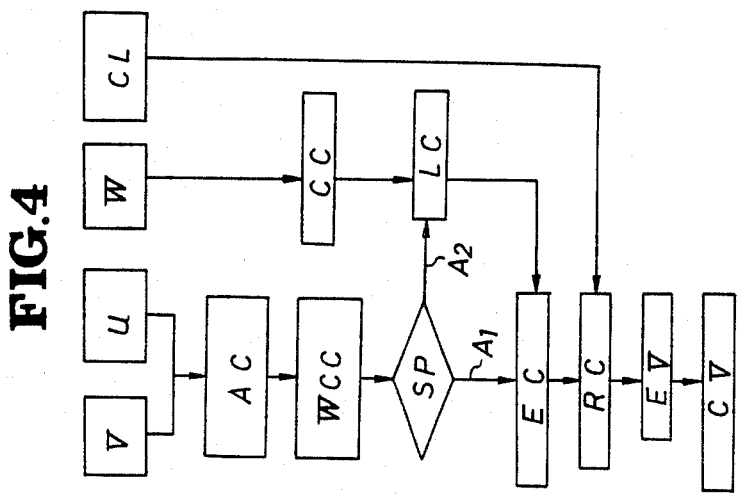
FIG. 4 is a block diagram of another embodiment.
Figure 5:
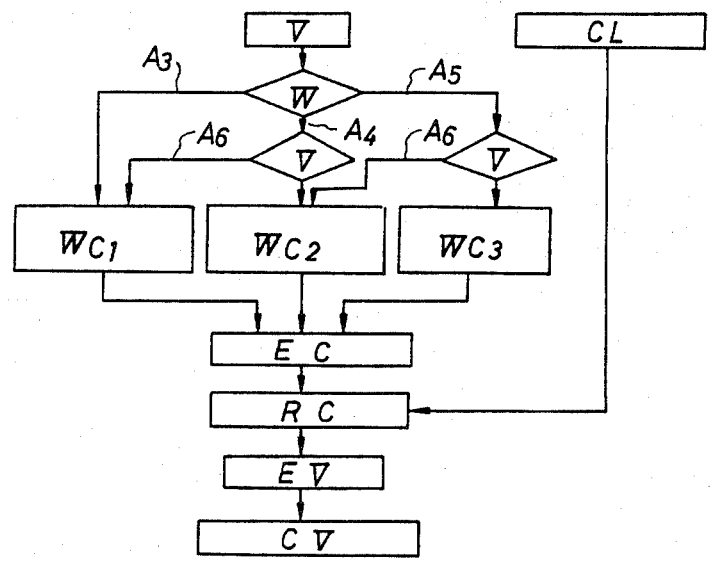
FIG. 5 is a block diagram of further another embodiment.

A block diagram of an embodiment of this invention, in case of performing automatic gear shift with regard to the loaded weight W in addition to the vehicle speed V and the engine load U, is shown in FIG. 4. WCC is a window type comparator circuit, SR is gear shift position, an arrow A1 is for first and second positions of the transmission gear, and an arrow A2 is for third and fourth positions of the transmission gear in FIG. 4. Further, a block diagram of an embodiment of this invention, in case of performing automatic gear shift with regard to the loaded weight W in addition to the vehicle speed V, is shown in FIG. 5. In FIG. 5; WC1, WC2 and WC3 are window type comparator circuits for first to fourth positions of the transmission gear, for first to third positions of the transmission gear and for first to second positions of the transmission gear in that order; an arrow A3, an arrow A4 and an arrow A5 are for light weight, medium weight and heavy weight in that order; and an arrow A6 is for high speed of vehicle speed V.

Figure 7:
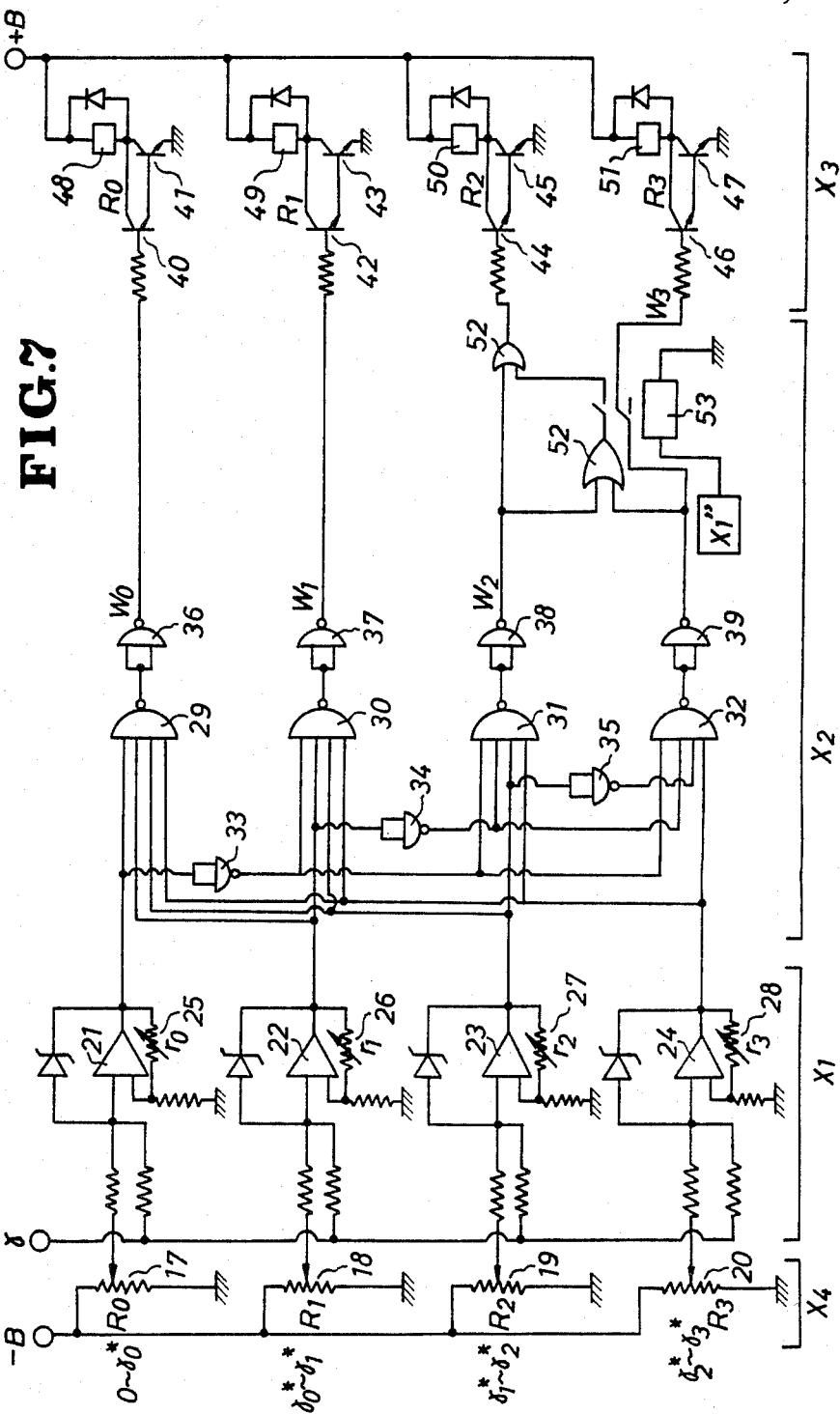
FIG. 7 is a circuit diagram for the embodiment of FIG. 4.

In the embodiment of this invention shown in FIG. 4 for example, application of this invention on the four-range transmission mechanism is made as shown in FIG. 7. As seen from FIG. 7, this circuit consists of the conventional hysteresis-including schmidt-trigger circuit $X_1$ receiving the electric signal of speed ratio $\gamma$, the logical circuit $X_2$ comprising the circuit $X_1''$ receiving the electric signal of loaded weight W and a logical element, and the actuating electric current amplification circuit for a transmission operating relay (a member functioning as a shift lever in a general transmission) responding to an actual speed ratio $\gamma^*$. $X_4$ is a gear shift point setting circuit. The circuit shown in FIG. 7 will be described hereunder.

In case where the speed ratio is changed from 0 to $Y_0^*, \ldots \gamma_3^*$; an output of the operational amplifier 21 is 1 and outputs of other operational amplifiers are also 1 (because of all outputs of the four schmidt-trigger circuits being 1), when a vehicle is in stopped condition, through functions of variable resistances 17, 18, 19, and 20 utilized for the gear shift point setting circuit $X_4$ in FIG. 7.

Now, consider the case that the vehicle makes a start from the stopped condition. An output 1 of the operational amplifier 21 at the topmost circuit in FIG. 7 passes through the NAND circuit 29 and the NAND circuit 36 to make the output $W_0$ 1, and actuates the relay 48 corresponding to the first position through functions of the transistors 40 and 41. The actuation of the relay 48 causes practical operation of transmission.

Considering an amplifier other than the operational amplifier 21, for example the amplifier 22, in case when a functioning signal is given to the relay 48; an output of the amplifier 22 is 1 and an input of the NAND circuit 30 depends upon outputs of the amplifiers 22, 23, and 24 and an output passing from the amplifier 21 through the NAND circuit 33 (imputs into the NAND circuit 30 are 0, 1, 1, 1). Consequently, an output of the NAND circuit 30 is 1, and an output of the NAND circuit 37 is 0, i.e. the output $W_1$ is 0. Similarly, the outputs $W_2$ and $W_3$ are both 0, so that the relays 49, 50, and 51 responding to the second position, the third position, and the fourth position respectively do not function.

When, in the next step, an input voltage (speed ratio $\gamma$) in the schmidt-trigger circuit $X_1$ increases as the vehicle speed increases to get as high as a previously prescribed voltage (designated as a threshold voltage which is to be predetermined on every actual speed ratio $\gamma^*$); the output of the amplifier 21, which has hitherto been 1, becomes 0 and therefore turns the first-position relay 48 to OFF through the NAND circuits 29 and 36, the output of the NAND circuit 37 becomes 1 to actuate the second-position relay 49 because the input side of the NAND circuit 30 is fed informations through the NAND circuit 33.

Namely, all the outputs of amplifiers are 1 at starting. The first-position relay 48 turns to ON for the first time. Then, as the vehicle speed increases, the output of the amplifier 21 becomes 0, and the relay 48 turns to OFF simultaneously with the second-position relay 49 turning to ON. Further, with an increase in the vehicle speed, the output of the amplifier becomes 0, the second-position relay 49 turns to OFF, and the relay 50 turns to ON. As mentioned above, the speed changing is performed to a higher stage in regular sequence. Consequently, when the output of the circuit $X_1''$ is 0 (the loaded weight is light), the speed changing is performed in order, finally to the top-gear. When the output of the circuit $X_1''$ is 1 (the loaded weight is heavy), the fourth-position relay does not operate through function the relay 53 even when the output of the NAND circuit 39 becomes 1. While, the third-position relay 50 operates to keep the speed ratio $\gamma$ at the third speed because the output of the OR circuit 52 becomes 1. Accordingly, in this composition, the gear shifting is performed up to the top gear in the same way as a conventional automatic gear shift mechanism when the loaded weight W is light, however, the gear shift is not executed to the top gear when the loaded weight W is heavy.

The actual shift position (first position to fourth position) and the logical circuit values are as listed in the following table, and positions "1" in the table indicate relay functioning points after all.

In case when output of circuit $X_1''$ is 0:

| | $\gamma$ | | | |
|---|---|---|---|---|
| Wi | $0 \sim \gamma^*_0$ | $\gamma^*_0 \sim \gamma^*_1$ | $\gamma^*_1 \sim \gamma^*_2$ | $\gamma^*_2 \sim \gamma^*_3$ |
| $W_0$ | 1 | 0 | 0 | 0 |
| $W_1$ | 0 | 1 | 0 | 0 |
| $W_2$ | 0 | 0 | 1 | 0 |
| $W_3$ | 0 | 0 | 0 | 1 |

In case when output of circuit $X_1''$ is 1:

| | $\gamma$ | | | |
|---|---|---|---|---|
| Wi | $0 \sim \gamma^*_0$ | $\gamma^*_0 \sim \gamma^*_1$ | $\gamma^*_1 \sim \gamma^*_2$ | $\gamma^*_2 \sim \gamma^*_3$ |
| $W_1$ | 1 | 0 | 0 | 0 |
| $W_2$ | 0 | 1 | 0 | 0 |
| $W_3$ | 0 | 0 | 1 | 1 |
| $W_4$ | 0 | 0 | 0 | 0 |

Figure 6:
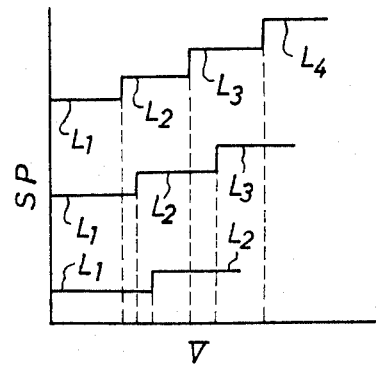
FIG. 6 is a vehicle driving characteristic diagram for the embodiment of FIG. 5.

When this invention is applied on the four-range transmission mechanism in accordance with the block diagram as shown in FIG. 1, the vehicle characteristics as shown by FIG. 6 can be realized. In this case, however, circuits as shown in FIG. 7 are used for the window type comparator circuit shown in FIG. 5 respectively, and each variable resistance value is set so that the vehicle characteristics are obtainable as indicated in FIG. 6. A horizontal axis is for the vehicle speed V, a vertical axis is for the shift position SP of the transmission; lines L1, L2, L3, L4 are for first position (slowest position), for second position, for third position, and for fourth position of the transmission gear in that order; and a lower line indicates the shift only between first and second positions, a medium line indicates the shift between first and third positions, and an upper line indicates the shift between first and fourth positions; in FIG. 6.

Since more accurate gear shift control can be performed in this invention by adding the loaded weight W as a control factor to the conventional gear shift control factors such as the vehicle speed V, the engine rotational speed N, and the engine load U; not only the trouble, that the vehicle speed increases excessively in proportion to the loaded weight, can be solved but the trouble, that obtaining an appropriate engine braking effect becomes impossible due to automatic gear shift to a higher position in descending a slope, can also be eliminated.

The shift controlling logic depending on the gear shift factors can be freely modified by changing the variable resistance values in the schmidt-trigger circuits $X_1$, $X_1'$, and $X_1''$ and by composing the logical circuit adjusting to the vehicle characteristics and the driving characteristics.

What is claimed is:

1. A method of automatically controlling the transmission ratio and gear shifting operation of a stepped transmission in a vehicle, where engine power is transmitted to the clutch and the driving wheels via said stepped transmission, said gear shifting operation being effected in dependence of vehicle speed, engine load and engine speed as control factors, comprising:

inputting into a comparator circuit a ratio of the vehicle speed to the engine load as well as a signal corresponding to the loaded weight of the vehicle, for automatically controlling the transmission and gear shifting operation from a high speed position to a next lower speed position;

expanding the high speed area in each selected speed change position corresponding to an increase in loaded weight;

inputting the output of said comparator circuit to a logic circuit; and controlling the speed change position in response to an output signal from said logic circuit.

2. An automatic controlling method of a transmission as set forth in claim 1, in which said comparator circuit consists of a shmidt-trigger circuit.

3. An automatic controlling method of a transmission as set forth in claim 1, in which an output from an arithmetic circuit actuates an electro-magnetic valve to cause an actuation of a control valve by means of oil pressure, and said actuation of said control valve controls a transmission.

4. The automatic controlling method of claim 3, wherein said arithmetic circuit receives inputs from a vehicle speed sensor, a vehicle load sensor, a shift lever position sensor, an engine load sensor, and an engine speed sensor.

* * * * *